US009575279B1

(12) United States Patent
Yoshizawa (10) Patent No.: US 9,575,279 B1
(45) Date of Patent: Feb. 21, 2017

(54) OPTIC TERMINATION BOX (71) Applicant: Furukawa Industrial S.A. Produtos Elétricos, Curitiba (BR)

(72) Inventor: Wilherm Toshio Kinoshita Yoshizawa, Curitiba (BR)

(73) Assignee: FURUKAWA INDUSTRIAL S.A. PRODUTOS ELÉTRICOS, Curitiba (BR)

( * ) Notice: Subject to any disclaimer, the term of this patent is extended or adjusted under 35 U.S.C. 154(b) by 0 days.

(21) Appl. No.: 15/099,133

(22) Filed: Apr. 14, 2016

(51) Int. Cl.
*G02B 6/00* (2006.01)
*G02B 6/255* (2006.01)
*G02B 6/36* (2006.01)
*G02B 6/48* (2006.01)
*G02B 6/44* (2006.01)
*G02B 6/38* (2006.01)

(52) U.S. Cl.
CPC .......... *G02B 6/483* (2013.01); *G02B 6/3897* (2013.01); *G02B 6/445* (2013.01); *G02B 6/4444* (2013.01); *G02B 6/4453* (2013.01)

(58) Field of Classification Search
CPC .. G02B 6/3897; G02B 6/4441; G02B 6/4444; G02B 6/4453; G02B 6/4455; G02B 6/445; G02B 6/46; G02B 6/483

USPC ............... 385/76, 95–98, 135–138
See application file for complete search history.

(56) References Cited

U.S. PATENT DOCUMENTS

2005/0175307 A1* 8/2005 Battey .................... G02B 6/445
385/135

* cited by examiner

*Primary Examiner* — Akm Enayet Ullah
*Assistant Examiner* — Michael Mooney
(74) *Attorney, Agent, or Firm* — B. Aaron Schulman, Esq.; Stites & Harbison, PLLC (57) ABSTRACT

Optical termination box comprises: a base (10) articulating a lid (20) and fixing trays (80) for accommodating optical fiber splices and extensions; a panel (40) removably mounted on an opening (13) of a peripheral wall portion (12) of the base (10) and provided with cable openings (41) for passage of respective optical cables and connection openings (42) housing a respective fixed connector (50) for receiving a movable connector (55) of a respective approach cable (CA); a base plate (60) removably secured within the base (10) and carrying the anchoring means (65) and a support (70) that articulates trays (80), wherein the base plate (60), the anchoring means (65), the support (70) and the trays (80) form an internal module (IM) removable from the base (10) together with the panel (40) without dismantling of the anchors and optical connections between distribution cables (CD) and any extension cables (EC) and approach cables (CA).

10 Claims, 13 Drawing Sheets

OPTIC TERMINATION BOX

FIELD OF THE INVENTION

The present invention refers to telecommunications by optical fiber arts and more particularly relates to a splicing or terminating air box for optical cables, usually called "termination box" mainly applied to access fiber optic networks called FTTH ("fiber to the home"). The termination box of the present invention is of the type having a base articulating a lid and having a replaceable set of input and output ports for distribution cables and approach cables ("drop" cables), wherein there are mounted internal trays for splicing optical fiber or assembly headers within the base, superimposed for accommodation of fiber optics, eventual amendments or internal connectors.

BACKGROUND OF THE INVENTION

Fiber optic telecommunications systems employing optical cables and electronic equipment require the provision of splice points and endpoints, for user activation.

At a splice point, for example, all of the fibers at one end of a given cable are spliced to corresponding fibers of a new cable length to give continuity to the optical cable required to reach a new splice point or a user activation endpoint.

However, at a user's activation point, the fiber optic cable splice arriving at an air terminal box may be totally or partially connected to the cables approach, the so-called cable "drop" which are designed to transport the optical signal to end users of the network. The optical cable fiber bypass, which come to a termination box but are not connected to a respective cable "drop" may go through the box unchanged or amended to a new cable extension to continue towards a new point of amendment or user activation.

At both points, splicing and/or a user activation, the optical fibers may be exposed, if necessary, by removal of a specific length of protective cover of the optical cables to be suitably spliced to respective cable runs, distribution or approach ("drop"), remaining protected inside the seam or user activation termination box.

The splicing and/or termination box can be constructed to meet certain splice points and may acquire more generous dimensions to accommodate a greater amount of optical fibers, in the case of splicing points with a high score optical fiber, or it may be especially designed to operate totally or partially as a termination box, from which the "drop" cables depart and go directly to the end user facilities in a house or company.

The ports of such boxes may be terminated as inputs to branch, extension or approach ("drop") cables, or take the form of fixed optical connectors.

In case of ports as inputs, a passing-through cable enters the interior of the box so as to have one or more of its optical fibers coupled, each to an internal optical connector or spliced to an optical fiber of an approach cable ("drop") or a branch cable from the operator or to an extension cord to other parts of amendment or termination, thus having the amendments protected inside the termination box. An aerial splice box construction for fiber optic cables using internal optical connectors can be seen in a previous patent application BR10 2013 009448 0, from the same applicant.

In the case when the ports are defined by fixed optical connectors mounted on an external wall of the termination box, they are built so as to be specially protected against weather and also known as reinforced optical connectors, wherein movable optical connectors (terminals) are also especially constructed to be protected against weather are applied to the end of the "drop" cables, to be coupled to the fixed optical connectors installed in an external wall of the housing. In this case, the "drop" cables does not enter the termination box, the opening of the box lid being not necessary in order to perform the connection or disconnection of a "drop"cable, i.e. intervention from a subscriber of the FTTH ("fiber to the home") service.

Many fixed or mobile optical connectors having reinforced construction are known and are, mostly, for exclusive use by the developers thereof. However, there are also many fixed or mobile optical connectors with reinforced construction and free to use. Considering that the termination boxes described herein are usually designed to serve only a respective optical connector model of reinforced construction and for the exclusive use of the same box manufacturer in which they will be applied, the configuration of the optical termination boxes and the fixed or mobile optical connectors is predetermined, not allowing the operator/installer of the optical distribution network to use different types of optical connectors in a given termination box. In the known constructions, each termination or splice box model requires a respective fixed and mobile optical connector model.

The termination boxes have been designed to be primarily composed of two parts: base and lid. In this type of configuration, the ports to optical cables are necessarily embedded in one of the two parts (base or lid) and all necessary internal components such as cable anchors, splice trays, brackets and the like are required to be fixed at one of these two parts, usually within the base.

Although this type of construction simplifies production, it is often difficult for the operator/installer of the optical network, especially in cases of maintenance. There are rare cases of damage to termination boxes due to: natural disasters or caused by third parties; maintenance of other systems in the case of box installation to pole; reforms in buildings or facade wherein the box is installed, and vandalism.

In the case of existing termination boxes in the market, in the event of any damage to the box there is no other choice but to redo the entire installation, which entails the following: remove the "drop"cables; remove the distribution cables and extension that are internal to the box; possibly remove fixed and mobile optical connectors, fiber extensions, splice trays and passive optical splitters; replace the terminal box; replace the internal components; redo the preparation of distribution, extension and approach ("drop") cables; redo the seams; and finally reconnect the "drop"cables.

SUMMARY OF THE INVENTION

In view of the above discussed aspects, the present invention provides a termination box for optical networks access with aerial installation and able to easily modify the features thereof so as to support different models of optical connectors and yet have the base and the lid replaced without interrupting the optical connections between the distribution cable and any extension and approach cables operably linked to said termination box.

It is a further object of the invention to provide an air splice box, as defined above, that is able to effectively protect amendments or connections therein that were previously engaged.

The optical termination box of the invention is one of the type comprising: a base having a bottom wall; one settable and lockable cover lid against the base; a hinge connecting the lid to the base; and fixed trays, superposed inside the base for accommodating optical fiber splices and extensions.

According to the present invention, the housing comprises: a base portion having a peripheral wall, opposite to the lid hinge, provided from the upper edge thereof, an opening; one panel removably mounted onto the opening and provided with openings for cable, bearing sealing elements, input and/or output of a distribution cable, or extension approach and connection openings; mounted fixed connectors, each in a respective connecting opening for receiving therein an external end to the housing, a movable connector of a corresponding approach cable; a base plate mounted within the base and carrying the anchoring means for the attachment of a distribution, extension or passband cable by means of a cable opening and the respective panel of the sealing member; a support fixed on the base plate and articulating the trays, wherein the base plate, the anchoring means, the support and the trays form a removable inner module inside the base, together with the panel in case a base substitution of termination box occurs.

The construction proposed by the present invention allows such a termination box to be used in different applications with different arrangements of ports with different types of fixed and movable connectors but still maintaining its internal module removed from the base together with the panel, without requiring the dismantling of the anchors and optical connections between the distribution cable and any extension and approach cables operably linked to termination box.

DETAILED DESCRIPTION OF THE INVENTION

As illustrated in the drawings, the optical termination box of the invention comprises a base 10 and a cover lid 20, both built in non-electrically conductive material, usually a polymer, with the base 10 generally shaped as a tray and having, in a single piece, a bottom wall 11 and peripheral wall 12 portions that define an upper edge 12a of the base 10 and the lid 20 having a lower edge 22a which is settable and lockable against the upper edge 12a of the base 10, to ensure an adequate seal to at least prevent the entry of dust, rainwater and insects.

Figure 1:
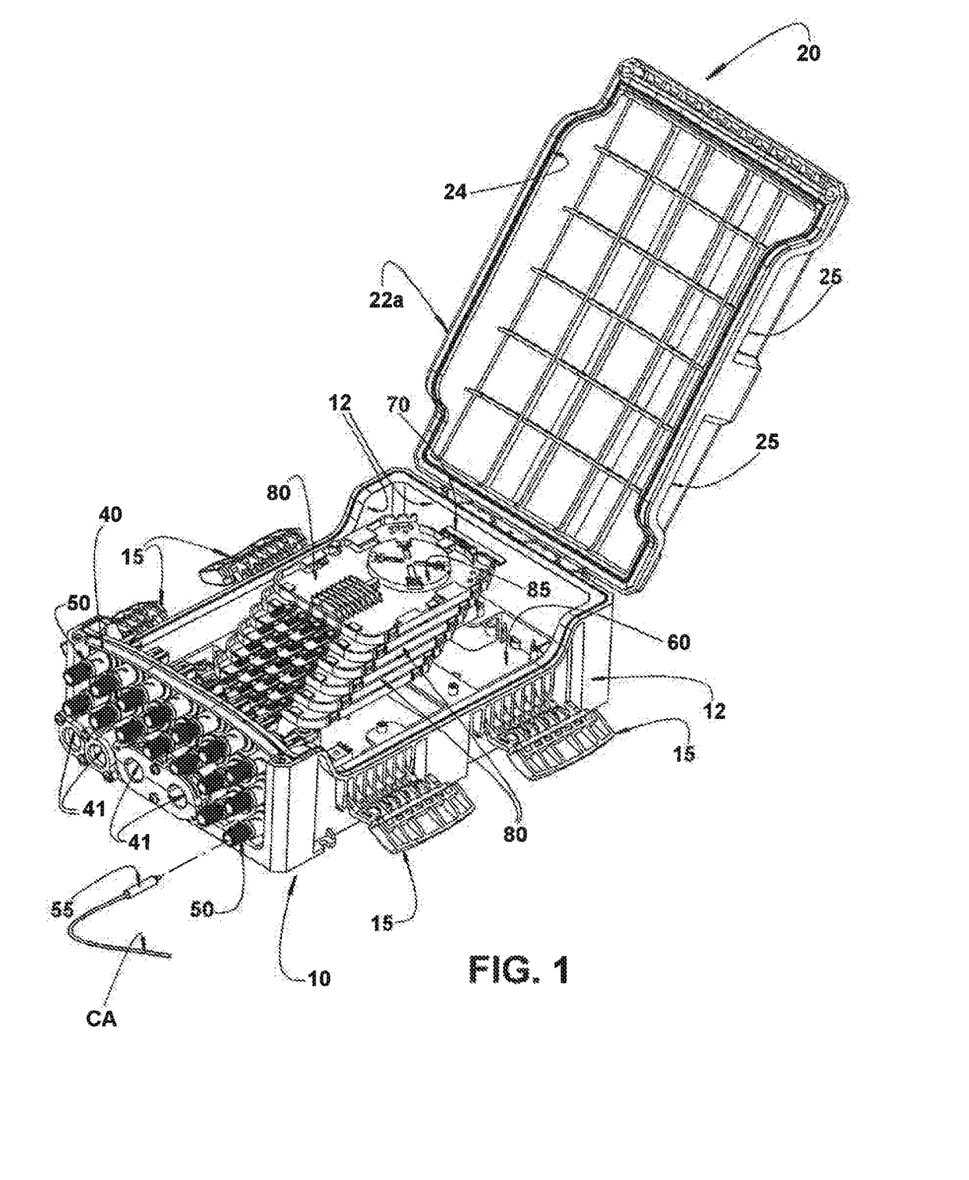
FIG. 1 is a perspective view of the termination box of the invention with the lid thereof in an open condition and the removable panel provided with four cable openings and a plurality of connection openings, each of which carrying a fixed connector.
Figure 2:
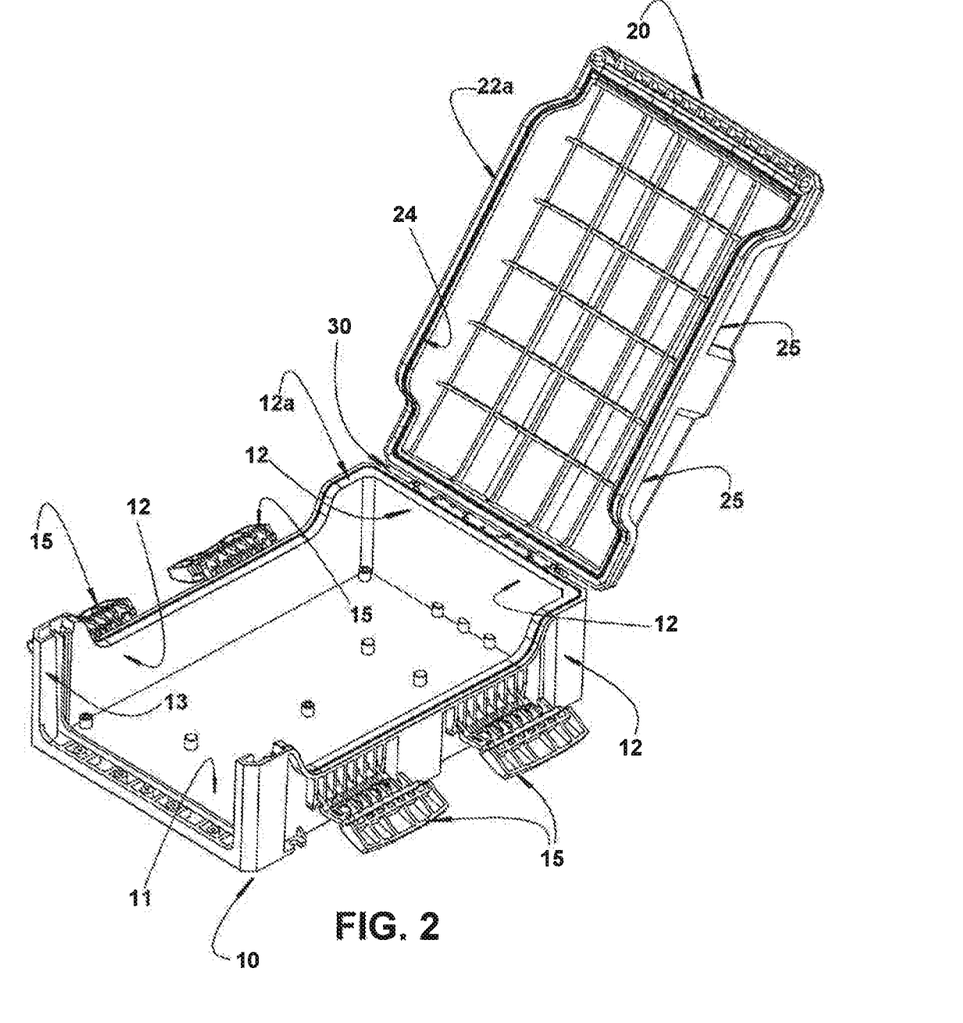
FIG. 2 shows a top perspective view of the FIG. 1 housing with the lid in the open condition and with both the inner module and the panel removed to show the attachment points of the base plate of the internal module on the wall base bottom.

A pivot 30, having a separable construction and built in any suitable type connects the cover lid 20 to one of peripheral wall portions 12 of the base 10 to allow the lid 20 to be angularly displaced between a closed position wherein the bottom edge thereof 22a is seated against the upper edge 12a of the base 10, and an open position, illustrated in FIGS. 1 and 2, having a distal bottom edge 22a of the upper edge 12a of the base 10 to allow access to the interior of the box by the operator/installer of the fiber optic network.

The aerial optical termination box of the invention has a sealing gasket 24, shaped as an elastomer material ring fitted along the lower edge 22a of the lid 20 to guarantee the necessary tightness between these two parts when the lid 20 is closed.

The locking of the lid 20 in the closed position can be obtained by different technical solutions, such as that illustrated in FIGS. 1 and 2 and comprises two pairs of jaws 15 hinged externally with two peripheral wall portions 12 of the base 10, opposite each other, wherein said jaws 15 are engageable by pressure on its external side teeth 25 of the lid 20. This construction allows the operator/installer to either close or open the box in a very simple and practical way, requiring no effort and with no undesirable special tool.

In the illustrated embodiment, the tray 10 and the lid 20 present a substantially rectangular outline, with the joint 30 being provided on one of the shorter sides of the box.

As can be seen in FIG. 1, the lid 20 has its full open position lag of more than ninety degrees from its closed position, making the inside of the box accessible to the operator and allowing the lid 20 to remain stable in the open position without causing inconvenience to the operator when performing work inside the box.

According to a first aspect of the invention, the base 10 of the termination box has a peripheral wall portion 12, distinct from that pivoted to the lid 20, provided from the upper edge 12a of the base 10, an opening 13 which occupies substantially the entire width and entire height of the said peripheral wall portion 12 of the base 10.

The opening 13 of the base 10 has its contour in a "U" shape defined by enclosing edges of the respective peripheral wall portion 12 of the base 10, in a channel shape for receiving, by sliding engagement, the respective edges of a panel 40 dimensioned to close, preferably in an airtight way, the said opening 13. The seal between the panel 40 and the peripheral wall portion 12 the base 10 can be done in different ways, for example by means of one elastomer sealing cord (not shown) housed in the panel receiving channel 40 background.

The above construction allows the panel 40 to be easily inserted and removed from the base 10, or an easy replacement of different panel models 40, as described later.

Figure 10:
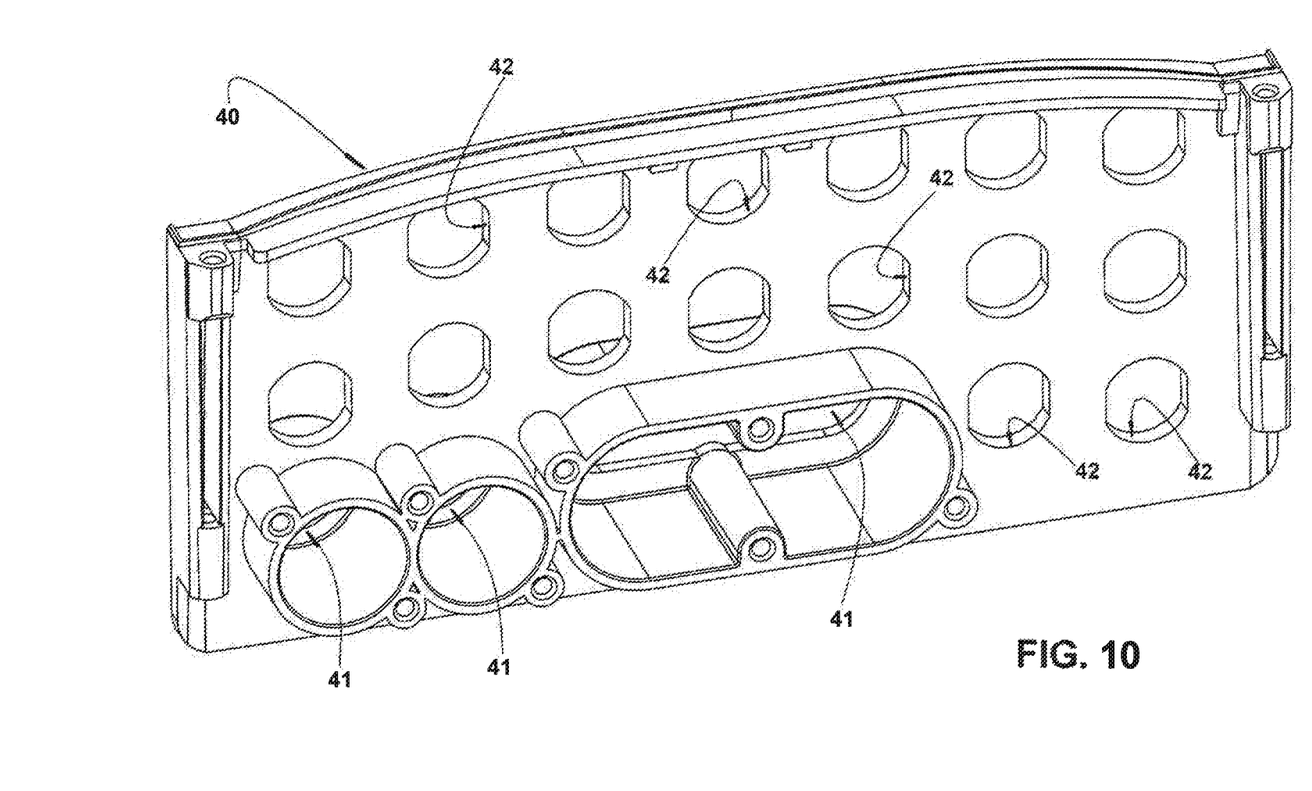
FIG. 10 represents a rear perspective view of the removable panel with its cable connection openings and devoid of sealing elements and also, respectively, of optical cables and fixed connectors.
Figure 11:
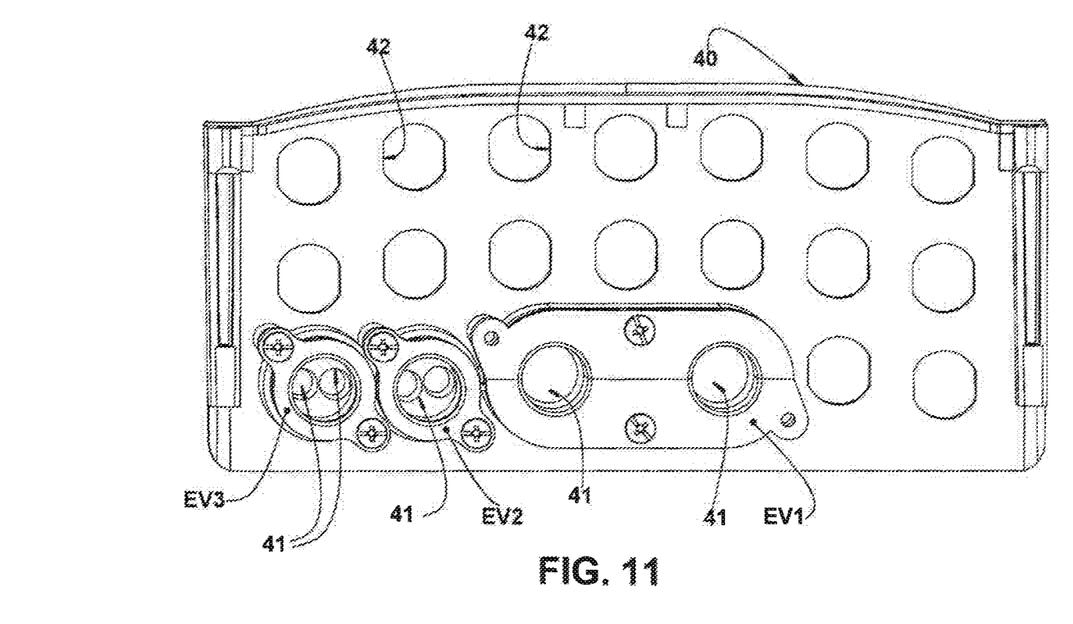
FIG. 11 is a perspective view similar to FIG. 10 but illustrating the sealing elements mounted on the removable panel cable openings.
Figure 12:
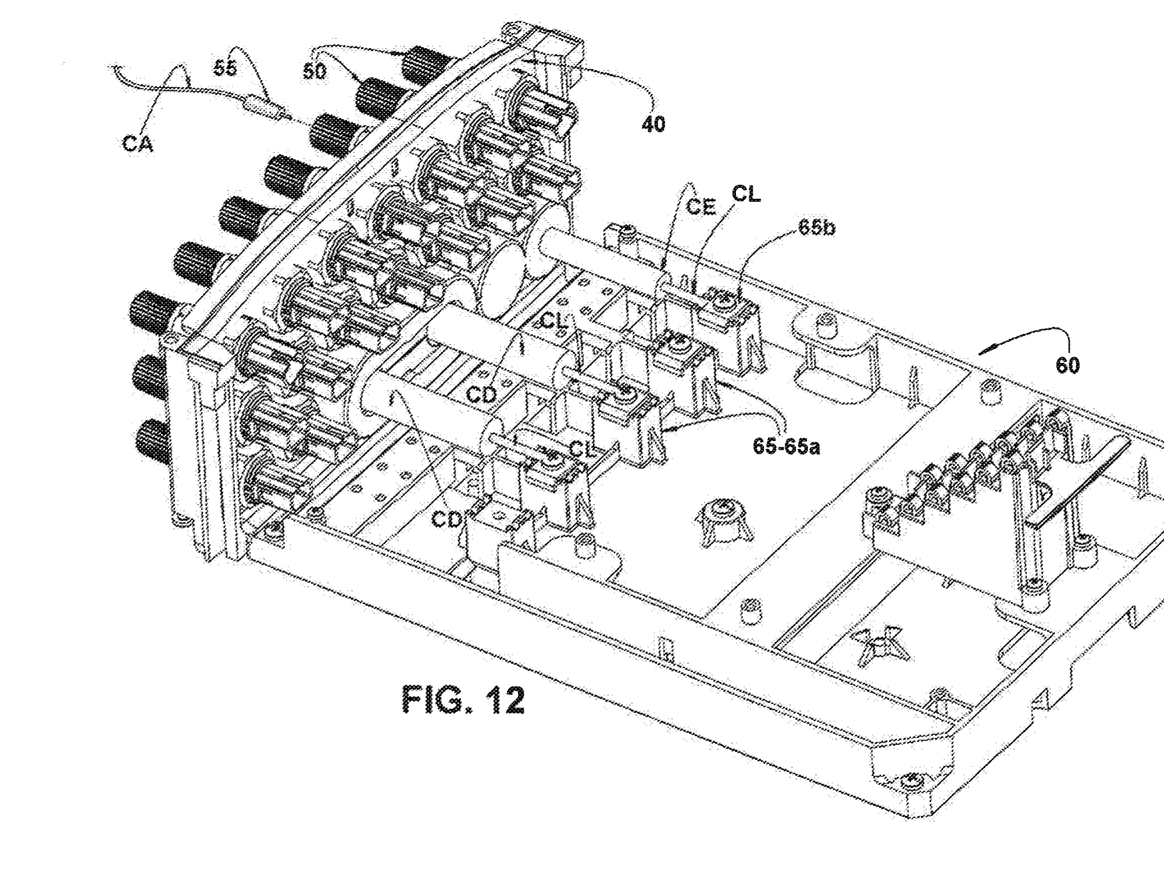
FIG. 12 is a perspective assembly view formed by the base plate and the removable panel bearing fixed connectors mounted on the connection openings, sealing members mounted to the cable openings and also two distribution cable and an extension cable, passers through their terminals and cable extensions having openings of their loose cables fixed in respective anchoring means on the base plate.

The panel 40 is generally provided and entirely defined within its outline, at least one cable opening 41 dimensioned to allow input and/or output of a CD distribution, an EC extension cord or CA approach ("drop") cable, illustrated in FIGS. 1 and 12, and also a plurality of connection openings 42 (see FIG. 10), each of which may be mounted in a fixed connector 50, of the reinforced type, to endure the weather and an external aerial installation.

As already mentioned in the introduction to this specification, the fixed connector 50 may have different constructions adaptable to respective connection openings 42 properly compatible with fixed connectors 50. Likewise, the cable openings 41 can be configured according to the installation of features on which the termination box will apply. Such a versatility is achieved by the fact that the panel 40 is easily replaceable and may be constructed according to different standards and installation requirements and applied to a same building base 10 and lid 20 of the box. Moreover, the panel 40 can be easily removed from its slide-in opening 13 of base 10 and seated on the opening of another base 10 without requiring disassembly of the CD distribution, CE extension or AC approach cables at their cable openings 41 or the disassembly of the fixed connector 50, which leads to the advantages of this box, together with the internal constructional features thereof, as described below.

Each cable opening 41 carries a sealing element EV1, EV2, EV3 to seal the input and/or output of a CD distribution cable, an EC extension cord or an AC approach cable when this penetrate directly inside the box to have a fiber seamed with a respective fiber of the CD distribution cable by means of optical fusion, not shown.

The sealing elements EV1, EV2, EV3, are constructed by any suitable way well known in the art so as to ensure sealing said apertures, this not being a relevant aspect to the ones directly related to the subject invention.

Any CD distribution or EC extension cable passing through a corresponding cable opening 41 of panel 40 and a respective sealing element EV1, EV2 mounted on said cable opening has an inner end portion of the base 10 projecting an extension of its loose cable CL (see FIG. 12) which is fixed inside the housing as described below.

Each fixed plug 50 mounted on a connection opening 42 of panel 40 presents an outer end to the base 10 configured to receive a respective movable connector 55 (see FIGS. 1 and 12) fixed to the end of a respective CA approach cable out of the termination box for a user.

According to a second aspect of the invention, the termination box of the invention further comprises a base plate 60 removably attachable within the base 10 and a bracket 70 fixed on the base plate 60 and incorporating engaging means 71, each of which linking the extreme edge of a respective tray 80 angularly displaceable between a rest position, generally parallel to the bottom wall 11 of the base 10, and a retracted position generally orthogonal to said bottom wall 11.

Figure 3:
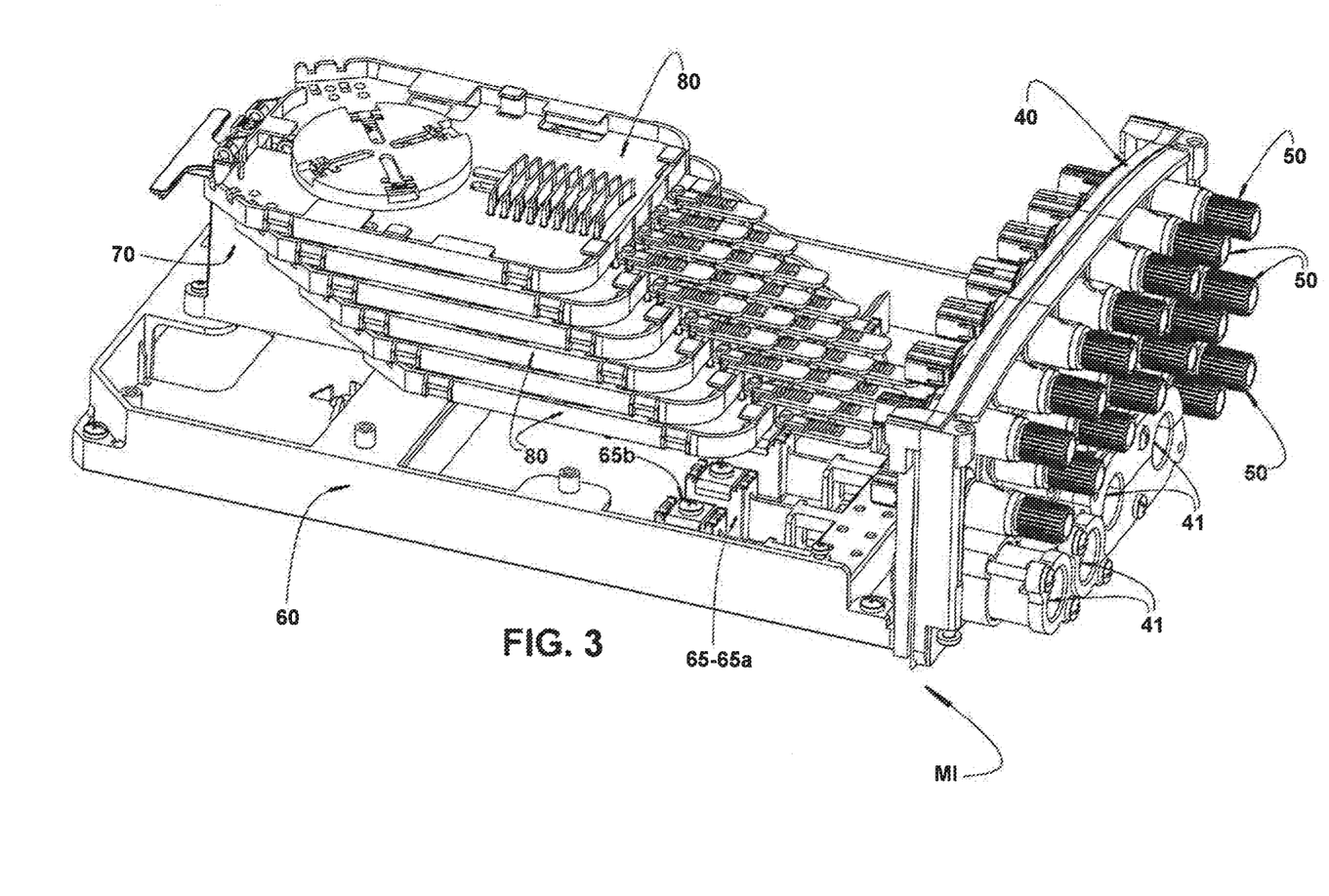
FIG. 3 is a top view and front perspective of the internal module and the removable panel illustrated in FIG. 1.
Figure 4:
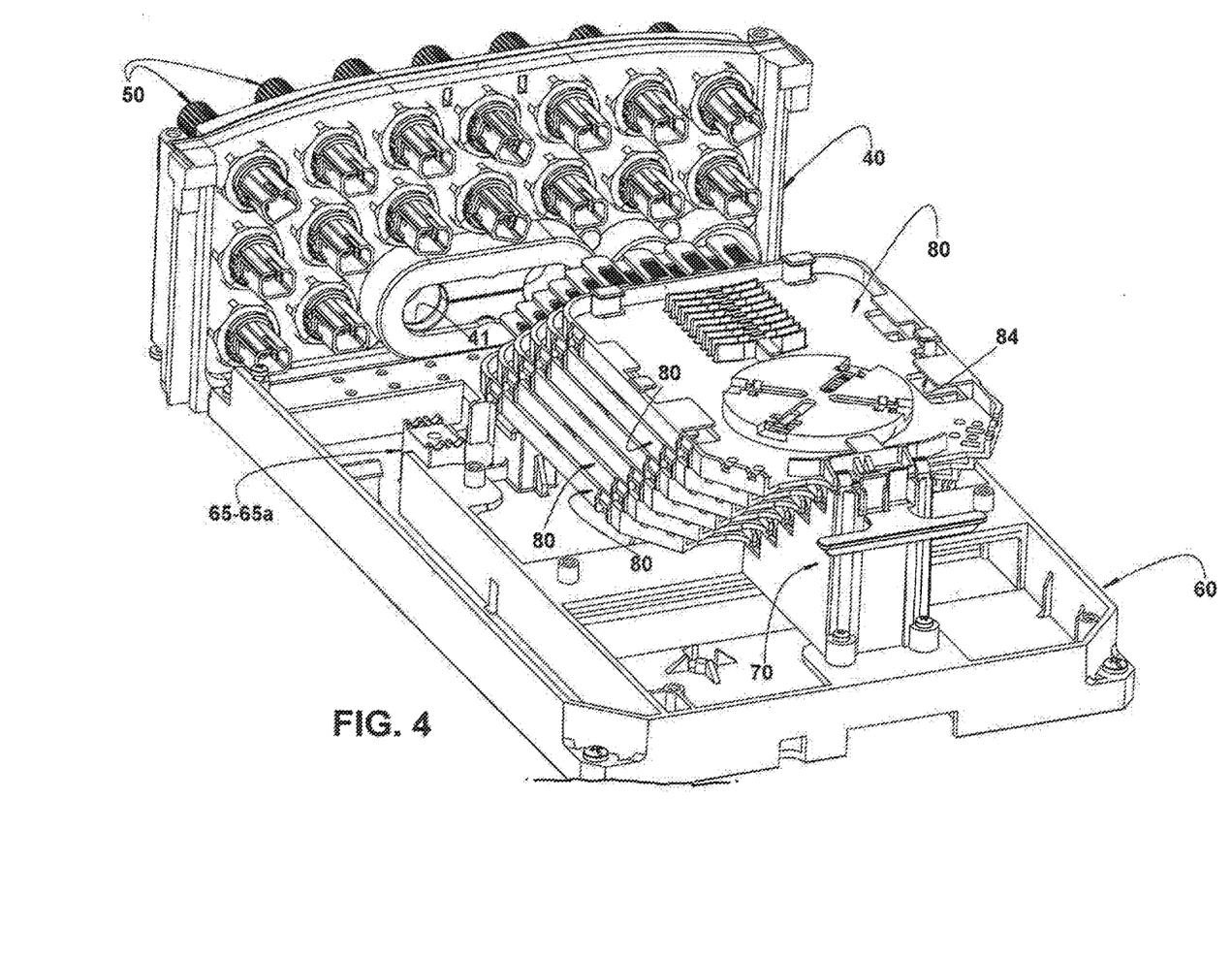
FIG. 4 is a top view and rear perspective view of the assembly of FIG. 3, formed by the internal module and the removable panel.
Figure 5:
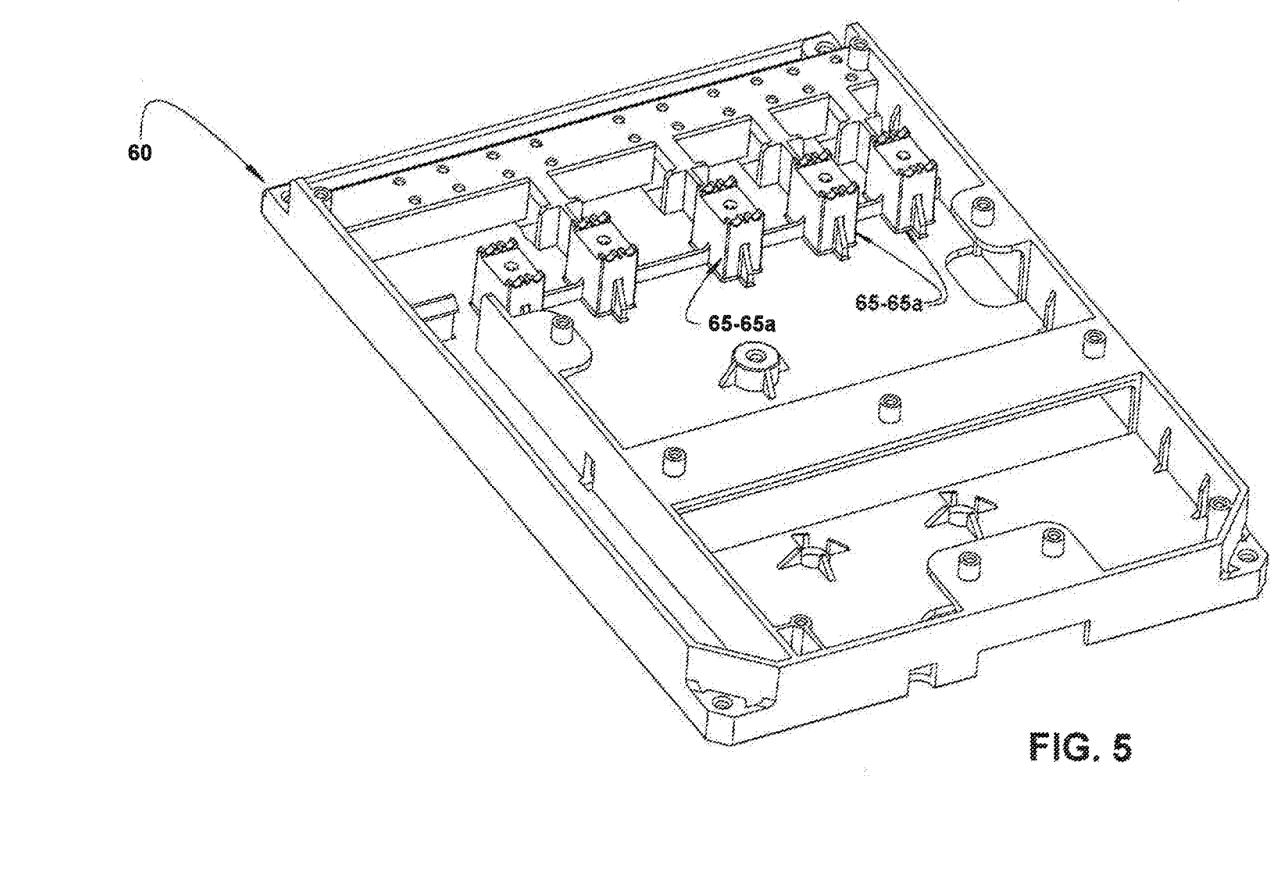
FIG. 5 is a top view and rear perspective view of the base plate of the internal module illustrated in FIGS. 3 and 4.
Figure 6:
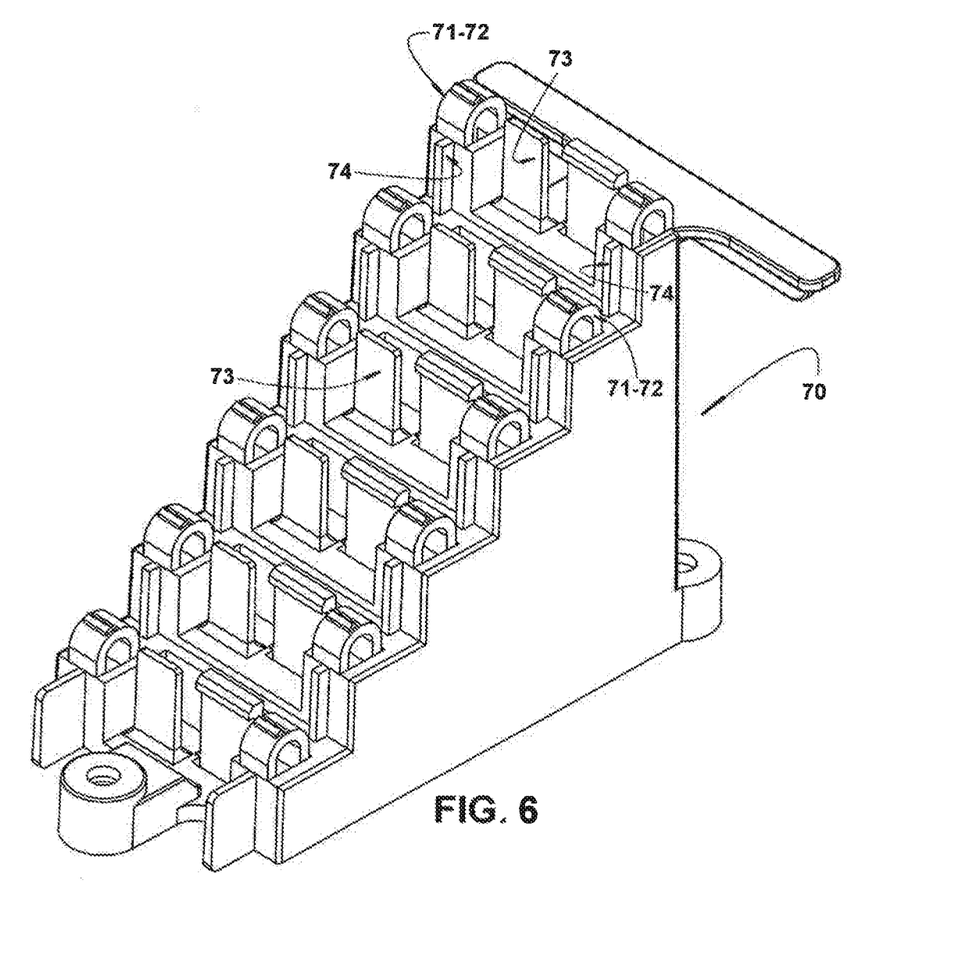
FIG. 6 is a top and anterior perspective view of the support belonging to the internal module illustrated in FIGS. 3 and 4.
Figure 7:
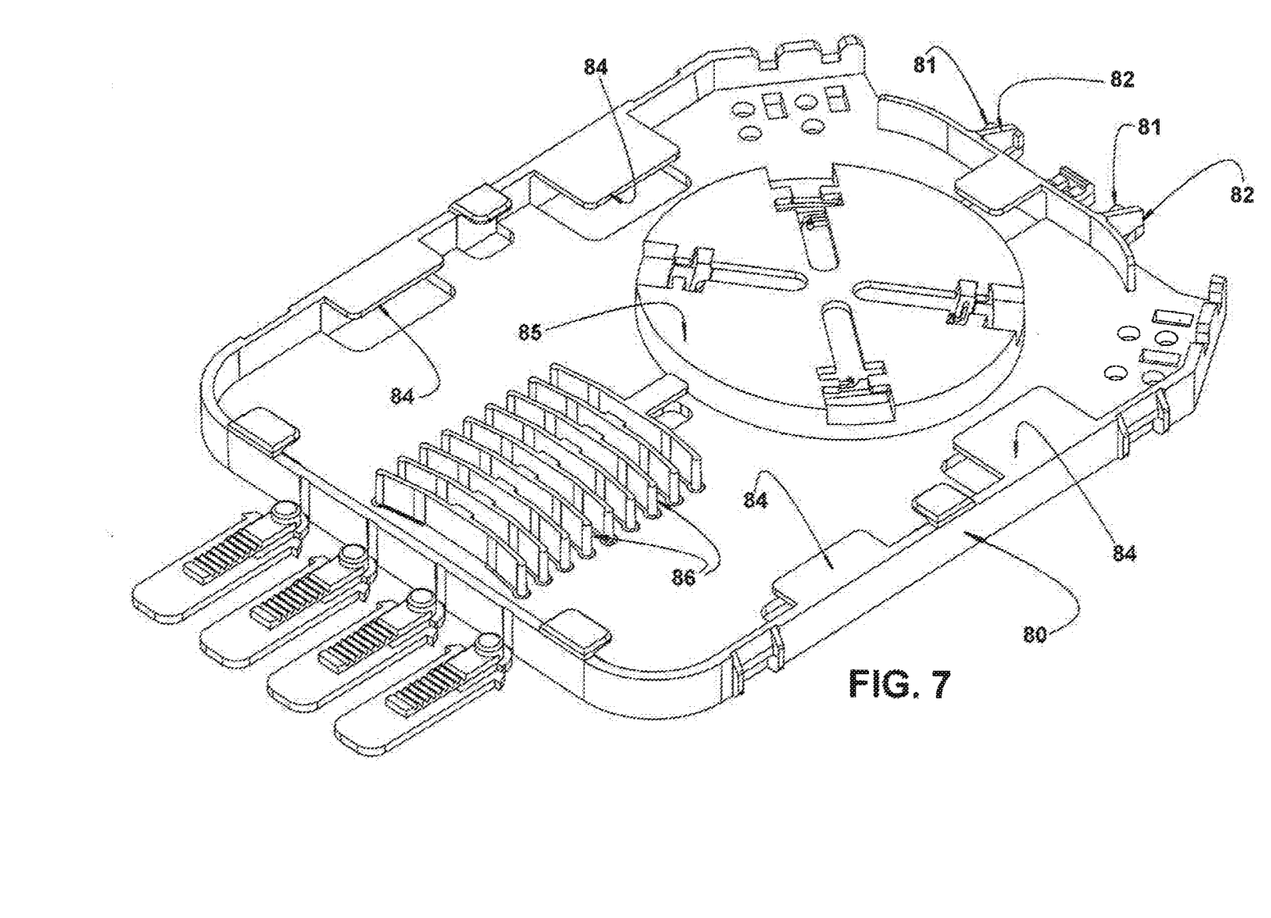
FIG. 7 is a top and front perspective view of one of the internal trays.
Figure 8:
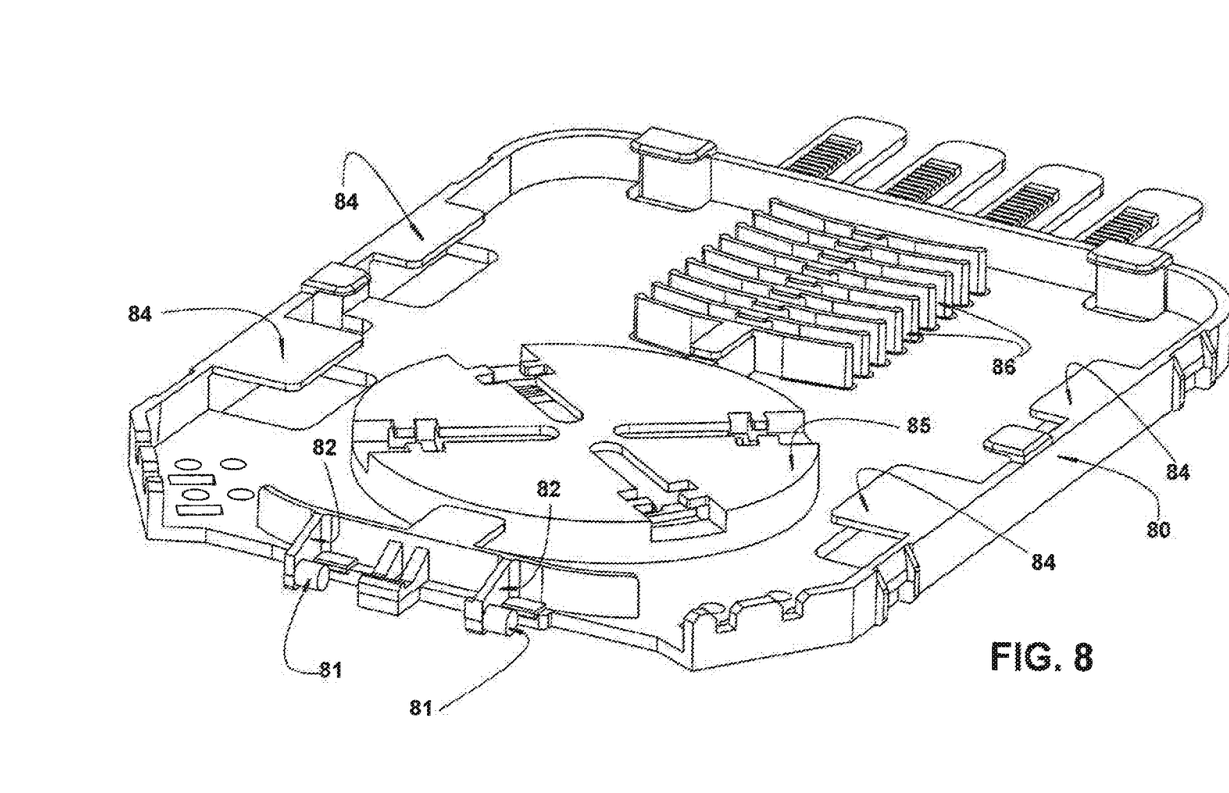
FIG. 8 represents a top view and a rear perspective of the inner tray.
Figure 9:
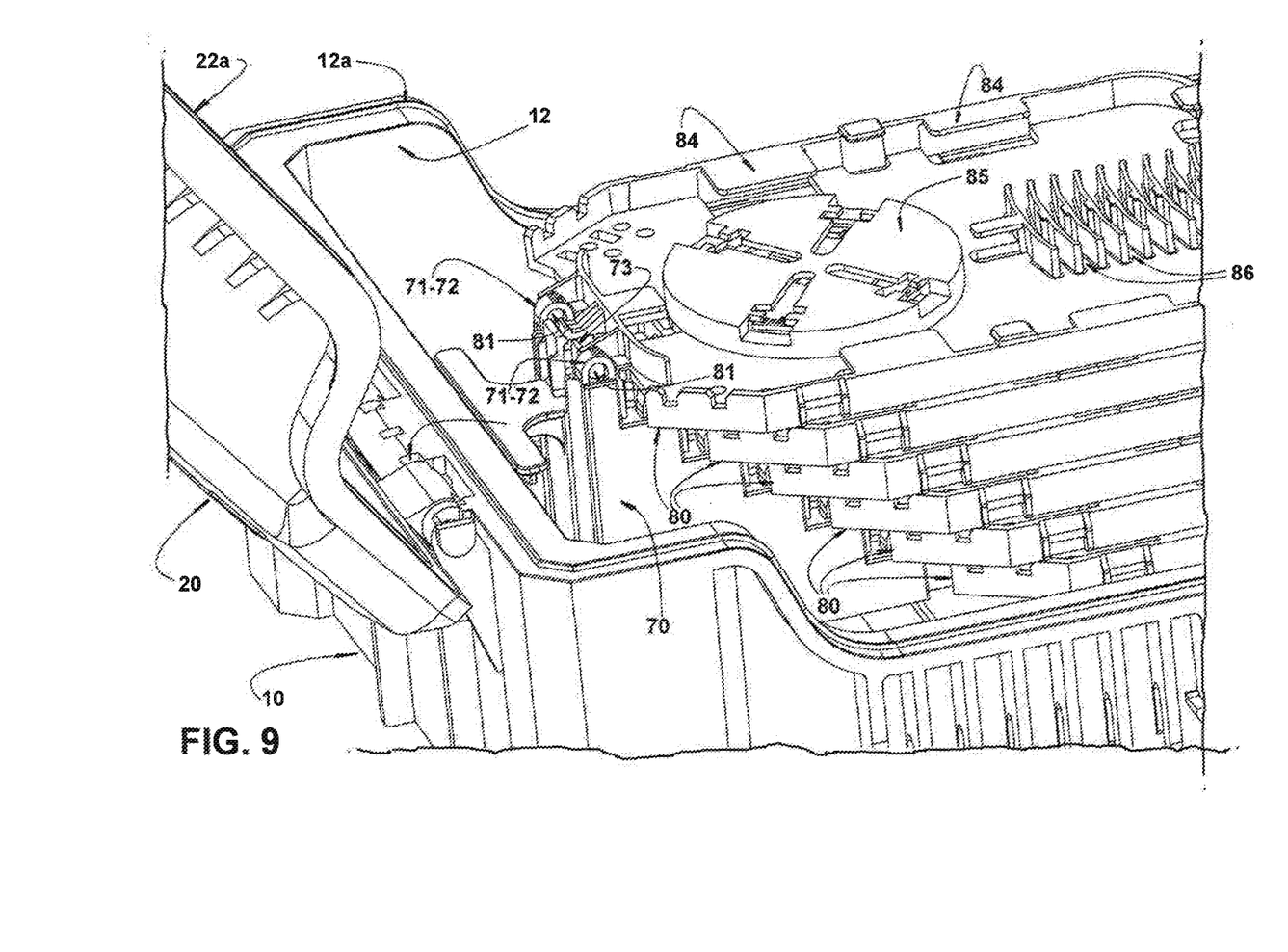
FIG. 9 is a partial perspective view of the internal module, illustrating the articulation of two internal trays in the upper region of the support.

As illustrated in FIGS. 3 and 12, the base plate 60 bears anchoring means 65 aligned with the cable openings 41 in the panel 40 and configured to receive and fix a respective CD distribution, CE extent or approach CA cable passing through a cable opening 41 and the respective sealing element EV1, EV2, EV3 panel 40. As already mentioned above, the end portions of the distribution CD, CE and AC extension approach cables that penetrate inside the box through a cable opening 41 extend over the base plate by portions of each respective cable loose CL, the latter being fixed to a respective anchoring means 65.

In the illustrated embodiment, each anchoring means 65 comprises a small tower 65a projecting upward from the base plate 60 and superiorly configured to receive and secure with screw tightening a bolt 65b retention pressing CL loose cord from the turret 65a.

The above construction allows the base plate 60, the anchoring means 65, the support 70 and the trays 80 to form an internal module IM built in non-electric conductive material and removable from the interior of the base 10, together with the panel 40 when there is the need for replacement of the base 10 and possibly also the lid 20 from the termination box.

As shown in FIG. 12, CD distribution or EC extension cables, passing by the respective cable openings 41 removable panel 40, have an extreme inner portion of the base 10, projecting a portion of its cable loose CL that is set at a respective anchoring means 65 provided in an adjacent region of the baseboard 60, keeping the latter physically connected to the panel 40, while the anchor of said CD distribution and CE extension cables is not dismantled.

Figure 13:
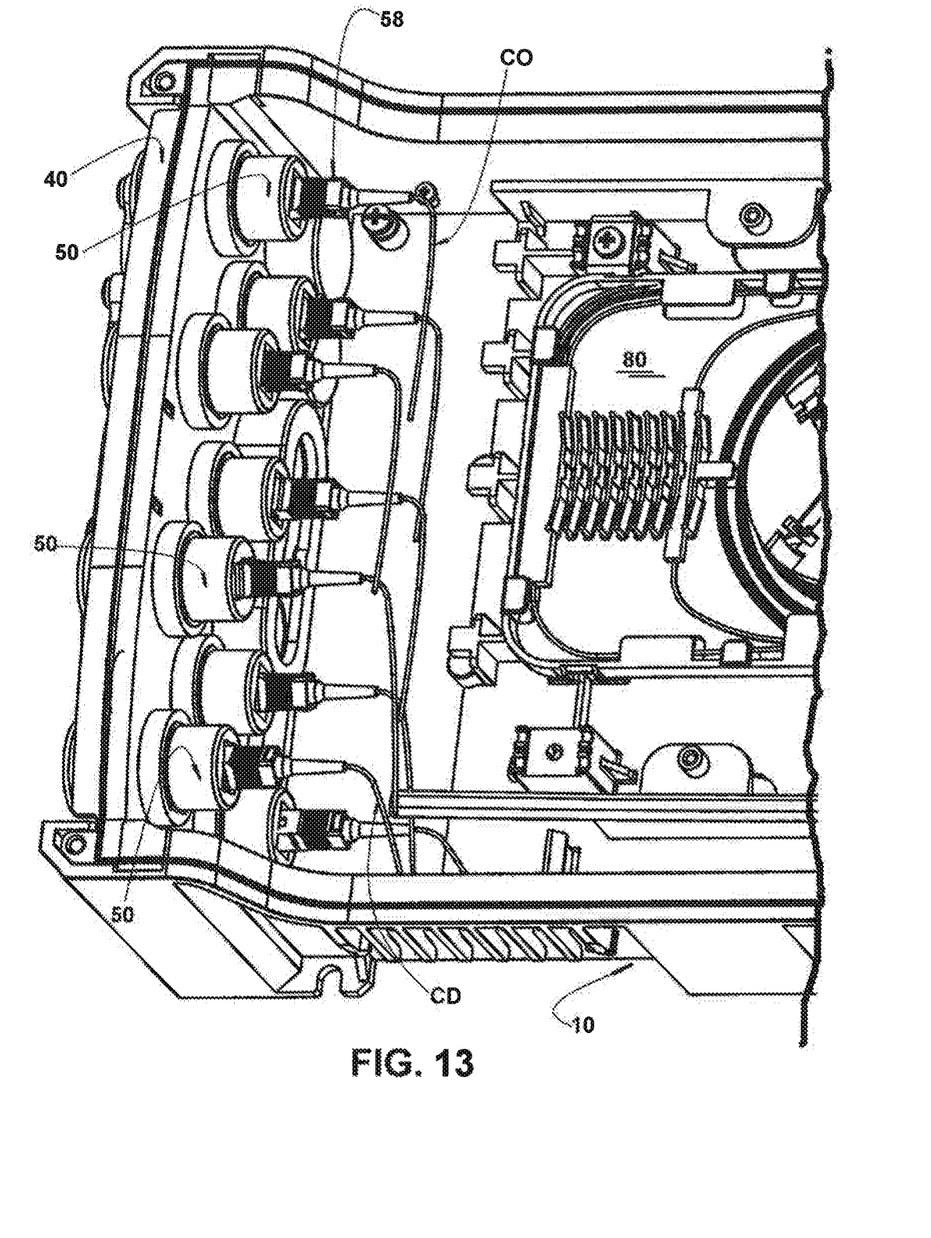
FIG. 13 illustrates a top perspective view of the housing base, with the panel bearing removable fixed connectors wherein the internal ends thereof are connected to respective optical fiber approach cables, not illustrated.

Moreover, the optical extension cables CO are to be connected to respective AC approach cables external to the housing, are accommodated in the trays 80 and can be provided with terminal connectors 58 to be engaged with the extreme internal fixed connectors 50 mounted through the panel 40 connecting openings 42, as illustrated in FIG. 13. However, although not illustrated herein, the optical cable that runs inside the box and CO derived from a CD distribution cable may be coupled by optical fusion or by non-illustrated internal connectors directly to respective bushings CA approach cables through a respective cable opening 42 of panel 40. In this case, the connection between the AC approach and cable distribution CD cables is made through the fixed and mobile connectors 50, 55.

In the embodiment illustrated in the drawings, the base plate 60 is seated and fixed on the bottom wall 11 of base 10, usually by screws, not shown, and after trespassing the baseboard 60, are fixed in tubular columns internally embedded in said bottom wall 11. Thus, the base plate 60 can be easily disassembled and assembled inside the base 10, allowing the internal module IM and the panel 40 can to be quick, easy and jointly removed from the base 10, while keeping intact the physical connection between said parts through a distribution CD and/or CE extension cable and even the CA approach cable lengths or optical cable CO internal to the box.

In addition to the fact that the assembly of trays 80 on the support 70 carried by the base plate 60, allows the removal of the internal module IM, together with the panel 40, without requiring any disconnection of cables or splices, the trays 80 are articulated in engagement means 71 of the support 70, with these engaging means 71 being arranged staggered lagged together in orthogonal and parallel directions to the bottom wall 11, in a sloping alignment relative to the bottom wall 11 of the base 10, allowing the trays 80 to remain spaced overlapping and partially out of phase with each other in a direction parallel to said bottom wall 11 when in the rest position, and further moved to a hidden position, parallel and spaced apart according to a direction orthogonal to said bottom wall 11.

In the illustrated embodiment, each of the engaging means 71 of the support 70 comprises a pair of spaced bearings 72 and axially aligned with each other to receive each a pivot pin 81 embedded in a respective tray 80.

According to the illustrated example, each hinge pin 81 is embedded in one side of a support arm 82 projecting from an adjacent end edge of a respective tray 80, and the support 70 incorporates, associated with at least one bearing 72 of each engagement means 71, a stopper 73 elastically deformable between a deformed position to the release of engagement and disengagement of the pivot pins 81 in the respective pair of bearings 72, and a rest position in which it prevents the release of the pivot pins 81 from their respective nests within the bearing 72.

In order to allow the trays 80 to remain in its rest position, the carrier 70 incorporates, associated with each engagement means 71, at least one pair of support frames 74 upon which is seated an adjacent end region of a respective tray 80, when in its rest position, parallel to the bottom wall 11 of the base 10.

The trays 80 may have different configurations capable of meeting the operating needs that are expected from them, and in the embodiment illustrated in the drawings each tray 80 carries accommodation means 84 and optical fiber fixing means 85 for cable extensions and optical fiber and splice housing means 86.

As known in the art, each tray 80 allows the accommodation and organization of splices of the optical fibers within the termination box, preferably allowing the cross-entry of optical elements inside it, causing a tray to be retracted relative the other without causing sharp bendings in optical fibers.

The termination box construction proposed by the present invention allows solving two technical problems usually faced by users of this type of product and mentioned below.

The replacement of the panel 40 allows one to modify the fixed connector model 50 to be applied to a termination box, giving the user flexibility to choose the one that best fits the characteristics of the installation. Moreover, the fact that a panel 40 can be easily replaced according to different configurations of cable entries 41 and connection 42, enables one to begin the installation and operation of an optical distribution network with the use of a panel 40 constructed with cable entries 41 for the passage of AC approach cables whose internal terminations can be connected to other optical fibers of other CD leadwires and EC extent by melting optical fiber or the use of internal optical connectors not illustrated, as already mentioned above. This type of solution does not use, at least initially, fixed connectors 50 mounted on the panel 40, allowing the start of the optical distribution network operation with lower initial investment.

In addition to the above advantage, the solution proposed herein uses an internal module IM, comprising the base plate 60, the anchoring means 65, the support 70 and the trays 80, and can be detached from the base 10 together with the panel 40, carrying all internal functions and components of the termination box, allowing easy replacement of the base 10 and cover lid 20, without having to redo the entire installation, and without it there is a network service interruption optical distribution.

Although it has been herein illustrated solely an air termination box configuration, one must bear in mind that chances can be made in terms of form and arrangement of components without escaping from the constructive concept defined in the claims attached to this specification.

The invention claimed is:

1. An optical termination box comprising: a base (10) having a bottom wall (11); a lid (20) settable and lockable against the base (10); a hinge (30) connecting the lid (20) to the base (10); and trays (80) fixed, superimposed, within the base (10) for accommodating splices and fiber extension, the box characterized in that it comprises: a base (10) having a peripheral wall portion (12), opposite to the hinge lid (20) provided from its upper edge (12a), an opening (13); a panel (40) removably mounted in the opening (13) and provided with cable openings (41) carrying sealing elements (EV1, EV2, EV3) for input and/or output of a distribution cable (DC) of extension (EC) or approach (CA) and connection openings (42); connectors fixed (50) each fitted at a respective connection opening (42) for receiving, at an external end to the housing, a movable connector (55) of a respective approach cable (CA); a base plate (60) mounted within the base (10) and bearing anchoring means (65) for fixing a distribution (CD) span (EC) or approach (AC) cables passing through a cable opening (41) and the respective sealing element (EV1, EV2, EV3) of the panel (40); a support (70) fixed on the base plate (60) and articulating the trays (80), wherein the base plate (60), the anchoring means (65), the support (70) and the trays (80) form an internal module (IM) removable from the interior of the base (10) together with the panel (40) when there is a substitution the base (10) of the termination box.

2. The box according to claim 1, wherein the cable openings (41) and the connection openings 42 are defined entirely within the contour panel (40).

3. The box according to claim 1, wherein the support (70) incorporates coupling means (71), each of which is articulated the end edge of a respective tray (80) angularly displaceable between a position of rest parallel to the bottom wall (11) of the base (10) and a retracted position, orthogonal to said bottom wall (11).

4. The box according to claim 1, wherein any distribution (CD) or extension (EC) cable, passing through a respective cable opening (41) of the panel (40), has an end portion, internal to the base (10), projecting an extension of its loose cable (CL) fixed to a respective anchoring means (65) bore by the base plate (60), while the approach extension cables (CA) settled in trays (80) provide the mounting conditions defined by the passage of said extension through the sealing elements (EV1, EV2, EV3) of respective cable openings (41) of the panel (40) and its coupling to inner end of a respective fixed connector (50) mounted in an opening connection (42) of the panel (40).

5. The box according to claim 4, wherein the internal module (IM) and the panel (40) are jointly removed from the base (10), keeping intact their physical connection by means of a distribution (CD) and/or extension (EC) cable and further extensions of the approach cable (CA).

6. The box according to claim 1, wherein the base plate (60) is seated and fixed to the bottom wall (11) of the base (10).

7. The box according to claim 1, wherein the coupling means (71) are arranged staggered lagged each other in directions orthogonal and parallel to the bottom wall (11), according to a tilted alignment relative the bottom wall (11).

8. The box according to claim 1, wherein each engagement means (71) of the support (70) comprises a pair of bearings (72) spaced from and axially aligned with each other to receive, each, a pivot pin (81) embedded in a respective tray (80).

9. The box according to claim 8, wherein each pivot pin (81) is embedded in one side of a support arm (82) projecting from an adjacent end edge of a respective tray (80) wherein the support (70) incorporates, associated with at least one bearing (72) of each engaging means (71), a stop (73) elastically deformable between a deformed, release of engagement and disengagement position of the hinge pin (81) in the respective pair of bearings (72), and a rest position in which it prevents the release of one of the pivot pins (81) of the housing thereof within the respective bearing (72).

10. The box according to claim 8, wherein the support (70) incorporates, associated with each engagement means (71), at least one pair of support frames (74) on which it is seated an adjacent end region of a respective tray (80) when in its rest position, parallel to the bottom wall (11) of the base (10).

* * * * *

UNITED STATES PATENT AND TRADEMARK OFFICE
CERTIFICATE OF CORRECTION

PATENT NO.        : 9,575,279 B1
APPLICATION NO.   : 15/099133
DATED             : February 21, 2017
INVENTOR(S)       : Yoshizawa Page 1 of 1

It is certified that error appears in the above-identified patent and that said Letters Patent is hereby corrected as shown below:

On the Title Page

Please add section:

-- (30) Foreign Application Priority Data
September 17, 2015   (BR)............................102015023980-7 --

Signed and Sealed this
Ninth Day of May, 2017

Michelle K. Lee
*Director of the United States Patent and Trademark Office*